United States Patent
Takeuchi et al.

(10) Patent No.: US 9,611,624 B2
(45) Date of Patent: Apr. 4, 2017

(54) CONSTRUCTION MACHINE

(71) Applicant: HITACHI CONSTRUCTION MACHINERY CO., LTD., Tokyo (JP)

(72) Inventors: Ken Takeuchi, Kasumigaura (JP); Shinichiro Yoshida, Mito (JP); Itaru Naya, Tsuchiura (JP); Shigeyuki Yoshihara, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/710,638

(22) Filed: May 13, 2015

(65) Prior Publication Data

US 2015/0345110 A1    Dec. 3, 2015

(30) Foreign Application Priority Data

May 30, 2014   (JP) ................. 2014-112942

(51) Int. Cl.
*E02F 9/08* (2006.01)
*H01M 2/10* (2006.01)
(Continued)

(52) U.S. Cl.
CPC .......... *E02F 9/0866* (2013.01); *B60K 7/0015* (2013.01); *B60K 11/04* (2013.01); *E02F 9/123* (2013.01); *E02F 9/166* (2013.01); *E02F 9/20* (2013.01); *E02F 9/2075* (2013.01); *E02F 9/2091* (2013.01); *H01M 2/1083* (2013.01); (Continued)

(58) Field of Classification Search
CPC ......... E02F 9/0866; E02F 9/123; E02F 9/166; E02F 9/20; E02F 9/2075; E02F 9/2091; B60K 7/0015; B60K 11/04; H01M 2/1083; H01M 2220/20; B60Y 2200/412; H01G 2/10; H01G 9/0003; Y10S 903/907

See application file for complete search history.

(56) References Cited

U.S. PATENT DOCUMENTS 4,061,559 A * 12/1977 Kitamura ................. C25C 7/00
  204/237
4,873,155 A * 10/1989 Hirota ................. H01M 8/2485
  429/437

(Continued)

FOREIGN PATENT DOCUMENTS

FR    WO 2012032271 A1 *  3/2012 ............... B60K 1/04
FR         2998841 A1 *  6/2014 ............... B60K 1/04
(Continued)

*Primary Examiner* — Hau Phan
*Assistant Examiner* — Jacob Meyer
(74) *Attorney, Agent, or Firm* — Mattingly & Malur, PC

(57) ABSTRACT

An electric power storage device (19) disposed on a revolving frame (6) located closer to an upstream side in a flow direction of cooling air (F) than a heat exchanger (18) is provided on an upper revolving structure (4). The electric power storage device (19) has a box-shaped casing (20) forming an outer wall and a battery module (29) provided in the casing (20) and accommodating an electrolyte. An electrolyte discharge pipe (30) for discharging an electrolyte mist and/or electrolyte injected out of the battery module (29) at abnormality of the battery module (29) to an outside of the upper revolving structure (4) is provided on the casing (20).

2 Claims, 11 Drawing Sheets

(51) Int. Cl.
*E02F 9/20* (2006.01)
*E02F 9/16* (2006.01)
*E02F 9/12* (2006.01)
*B60K 7/00* (2006.01)
*B60K 11/04* (2006.01)
*H01G 9/00* (2006.01)
*H01G 2/10* (2006.01)

(52) U.S. Cl.
CPC .......... *B60Y 2200/412* (2013.01); *H01G 2/10* (2013.01); *H01G 9/0003* (2013.01); *H01M 2220/20* (2013.01); *Y10S 903/907* (2013.01)

(56) References Cited

U.S. PATENT DOCUMENTS

| | | | | |
|---|---|---|---|---|
| 5,037,520 | A * | 8/1991 | Harry | C08K 3/34 204/279 |
| 6,120,929 | A * | 9/2000 | Stocchiero | H01M 2/043 137/260 |
| 7,014,740 | B2 * | 3/2006 | Kim | C25B 1/06 204/242 |
| 2012/0285757 | A1 * | 11/2012 | Atarashi | B60K 1/04 180/68.1 |
| 2013/0294876 | A1 * | 11/2013 | Kobayashi | E02F 9/0866 414/744.2 |
| 2014/0234062 | A1 * | 8/2014 | Adachi | E02F 9/0858 414/687 |

FOREIGN PATENT DOCUMENTS

| | | | |
|---|---|---|---|
| JP | 2002-327461 A | | 11/2002 |
| JP | 2002327461 A | * | 11/2002 |

* cited by examiner

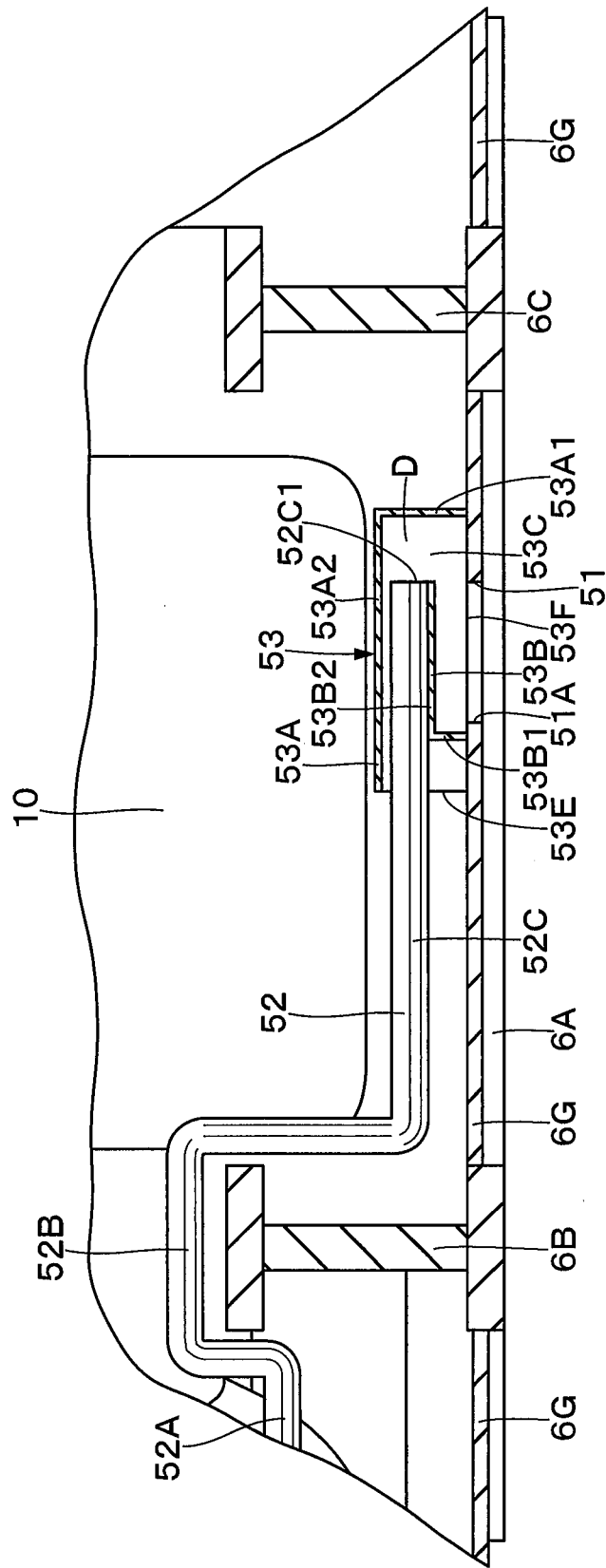

CONSTRUCTION MACHINE

TECHNICAL FIELD

The present invention relates to a hybrid-type construction machine having two types of power sources, that is, an engine and an assist power generator/electric motor, for example, so that these two types of power sources can be used as appropriate in accordance with a situation.

BACKGROUND ART

In general, a hydraulic excavator which is a typical example of a construction machine is made hybrid by being provided with the two types of power sources, that is, an engine and an assist power generator/electric motor for assisting driving of the engine in order to promote improvement of fuel efficiency, purification of an exhaust gas and the like.

In this hydraulic excavator, a vehicle body is constituted by an automotive lower traveling structure and an upper revolving structure provided rotatably on the lower traveling structure. A working mechanism driven by a hydraulic actuator is provided on a front side of the upper revolving structure.

The upper revolving structure includes a revolving frame forming a support structural body, an engine provided on the revolving frame at a location on a rear part side of the revolving frame, a hydraulic pump driven by the engine and supplying a pressurized oil to the hydraulic actuator, an assist power generator/electric motor connected to the engine and the hydraulic pump performing a power generator action and an electric motor action, a cooling fan sucking an outside air as cooling air and supplying the cooling air to the engine by rotating with the engine as a power source, a heat exchanger provided on the revolving frame at a location closer to an upstream side in a flow direction of the cooling air than the cooling fan and cooling a fluid by the cooling air, and an electric power storage device disposed on the revolving frame at a location closer to the upstream side in the flow direction of the cooling air than the heat exchanger and charging generated power by the assist power generator/electric motor or discharging the charged power (Patent Document 1).

PRIOR ART DOCUMENT

Patent Document

Patent Document 1: Japanese Patent Laid-Open No. 2002-327461 A

SUMMARY OF THE INVENTION

Incidentally, in the hydraulic excavator according to the above-described conventional art, arrangement of the electric power storage device close to the upstream side of the flow direction of the cooling air than the heat exchanger is proposed in order to suppress a temperature rise of the electric power storage device. In general, the electric power storage device used in the hydraulic excavator has a box-shaped casing forming an outer wall and a plurality of battery modules provided inside the casing. In this battery module, a plurality of battery cells in which an electrolyte is accommodated is disposed. In the casing, a safety valve is provided for suppressing an air pressure change in the casing.

The electrolyte of the electric power storage device might be injected into the casing in a high-temperature mist state from the battery module (battery cell) by overcharging of the electric power storage device and the like. In this case, the electrolyte mist is discharged from the safety valve of the casing and there is a concern that it is brought into contact with the devices including the heat exchanger, the engine, the power generator/electric motor, the hydraulic pump and the like flowing with the flow of the cooling air. As a result, there is a problem causing rusting and damage of these devices, which results in reduction of lives.

The present invention was made in view of the above-described problems of the conventional art and has an object to provide a construction machine in which contact of the electrolyte mist and/or the electrolyte emitted from the electric power storage device with the other devices can be reduced.

(1) In order to solve the above-described problems, the present invention is applied to a construction machine comprising: an automotive lower traveling structure, an upper revolving structure provided rotatably on the lower traveling structure, and a working mechanism provided on a front side of the upper revolving structure and driven by a hydraulic actuator, the upper revolving structure including: a revolving frame forming a support structural body; an engine provided on the revolving frame at a location on a rear part side of the revolving frame; a hydraulic pump driven by the engine and supplying a pressurized oil to the hydraulic actuator; an assist power generator/electric motor coupled to the engine and the hydraulic pump and performing a power generator action and an electric motor action; a cooling fan for sucking an outside air as cooling air and supplying the cooling air toward the engine; a heat exchanger provided on the revolving frame at a location closer to an upstream side in a flow direction of the cooling air than the cooling fan and cooling a fluid by the cooling air; and an electric power storage device disposed on the revolving frame at a location closer to the upstream side in the flow direction of the cooling air than the heat exchanger and charging generated power by the assist power generator/electric motor or discharging the charged power.

A feature of the configuration employed by the present invention is that the electric power storage device has a box-shaped casing forming an outer wall and a battery module provided inside the casing and accommodating an electrolyte; and an electrolyte discharge pipe for discharging an electrolyte mist and/or electrolyte injected out of the battery module at abnormality of the battery module to an outside of the upper revolving structure is provided on the casing.

With this arrangement, since the electric power storage device is disposed closer to the upstream side in the flow direction of the cooling air than the heat exchanger where a temperature cannot rise high easily, deterioration of the electric power storage device can be suppressed. Moreover, at abnormality such as overcharging of the electric power storage device and the like, for example, the electrolyte mist and/or electrolyte (hereinafter referred to as an electrolyte component) might be injected out of the battery module of the electric power storage device. In this case, the electrolyte component passes through the electrolyte discharge pipe provided in the casing of the electric power storage device and is discharged to the outside of the upper revolving structure. As a result, since contact of the electrolyte component with the heat exchanger, the engine and the like can be suppressed, reduction of lives of the devices such as the heat exchanger, the engine and the like can be suppressed.

(2) According to the present invention, the electrolyte discharge pipe is configured such that a base end side is connected to the casing of the electric power storage device, and a distal end side is opened on a lower surface side of the revolving frame. With this arrangement, even if the construction machine is rotated, dispersion of the electrolyte component to the periphery can be suppressed. Therefore, contact of the electrolyte component with a device in the periphery of the construction machine or a worker working there, for example, can be prevented.

(3) According to the present invention, a discharge port located below the engine and discharging the cooling air introduced into the upper revolving structure to below the revolving frame is formed in the revolving frame; and the electrolyte discharge pipe is configured to have its base end side connected to the casing of the electric power storage device and its distal end side arranged at the discharge port at a position avoiding the engine.

With this arrangement, the electrolyte component can be discharged with the flow of the cooling air flowing from inside the upper revolving structure (vehicle body) to the outside at a distal end opening of the electrolyte discharge pipe. As a result, the electrolyte component can be prevented from staying at the distal end opening of the electrolyte discharge pipe. Therefore, the electrolyte component can be efficiently discharged, and its temperature rise can be suppressed. Moreover, the discharged electrolyte component is discharged to the outside in a state diffused along the flow of the cooling air, the electrolyte component can be diluted. As a result, an influence to the periphery of the construction machine can be reduced.

(4) According to this embodiment, the discharge port for discharging the electrolyte mist and/or the electrolyte to the outside of the revolving frame is provided in the revolving frame, the electrolyte discharge pipe has a base end side connected to the casing of the electric power storage device and the distal end opening arranged in the vicinity of the discharge port; and a closed box body surrounding the distal end opening of the electrolyte discharge pipe and opened only in the discharge port and forming an electrolyte discharge chamber therein is provided on the revolving frame.

With this arrangement, after the electrolyte component is discharged from the distal end opening of the electrolyte discharge pipe, it is led to the discharge port through the electrolyte discharge chamber of the closed box body. As a result, contact of the electrolyte component with the devices such as the heat exchanger, the engine and the like or flowing back of the electrolyte component from the discharge port can be suppressed. Moreover, since the electrolyte component is not discharged directly to the outside from the electrolyte discharge pipe, the influence to the periphery of the construction machine can be reduced.

(5) According to the present invention, the battery module of the electric power storage device is constituted as a lithium ion battery. With this arrangement, since the electric power storage device can have a large capacity, size reduction of the electric power storage device can be realized.

BRIEF DESCRIPTION OF THE DRAWINGS

FIG. 11 is an enlarged view of an essential part showing a vicinity of a closed box body in FIG. 10 in an enlarged manner.

MODE FOR CARRYING OUT THE INVENTION

Figure 1:
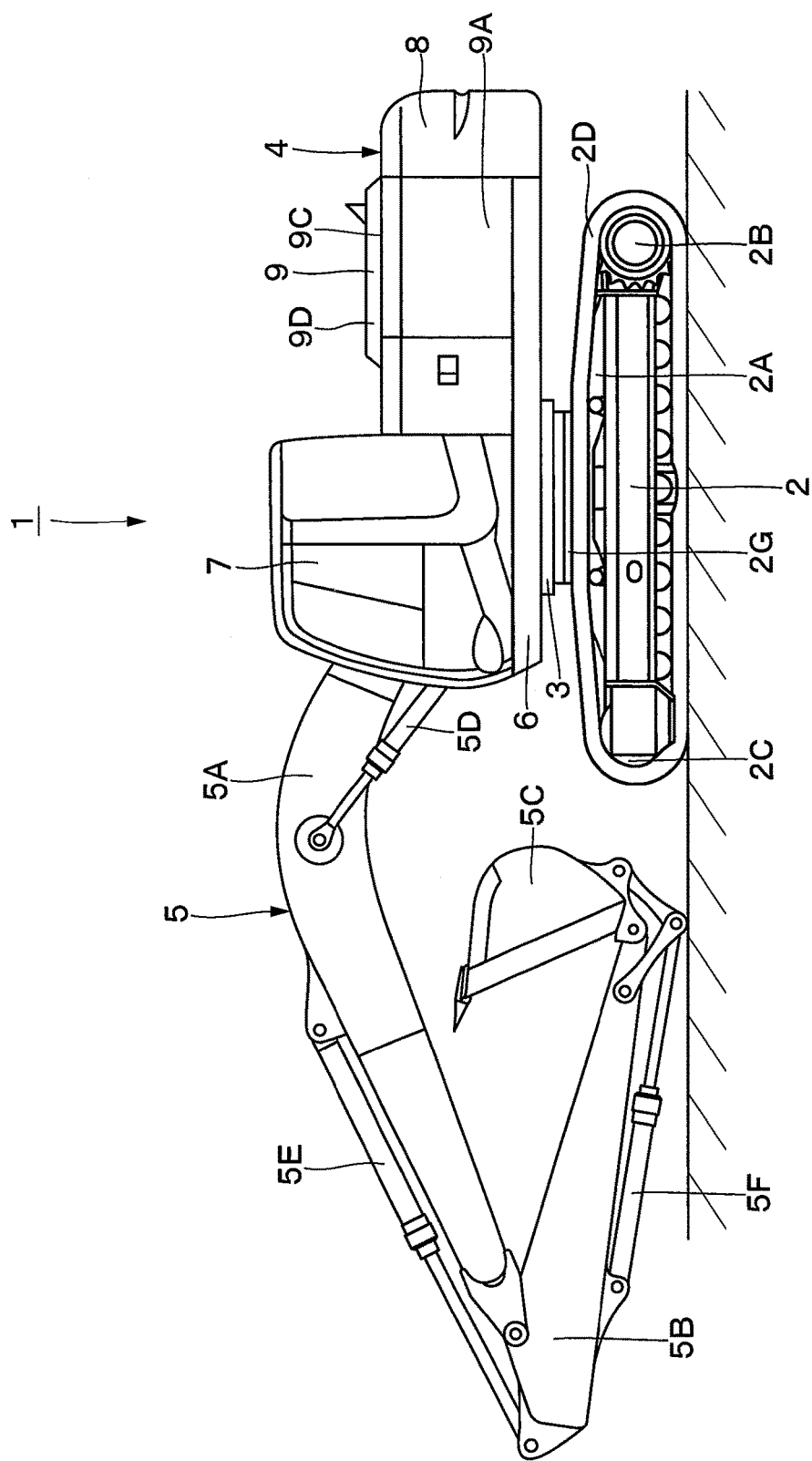
FIG. 1 is a front view showing a hydraulic excavator that is applied to a first embodiment of the present invention.

Hereinafter, an embodiment of a construction machine according to the present invention will be described in detail by referring to the attached drawings using a case applied to a hybrid-type hydraulic excavator using an engine and an assist power generator/electric motor as an example.

First, FIG. 1 to FIG. 6 show a first embodiment of a construction machine according to the present invention. In the figures, a hybrid-type hydraulic excavator 1 is a typical example of the construction machine according to this embodiment. This hybrid-type hydraulic excavator 1 (hereinafter referred to as the hydraulic excavator 1) is constituted by an automotive crawler-type lower traveling structure 2 and an upper revolving structure 4 rotatably mounted on the lower traveling structure 2 through a revolving device 3. On a front part side of the upper revolving structure 4, a working mechanism 5 is provided capable of moving upward/downward. The hydraulic excavator 1 is for performing an excavating work of earth and sand and the like by using the working mechanism 5. The lower traveling structure 2 and the upper revolving structure 4 constitute a vehicle body of the hydraulic excavator 1.

The lower traveling structure 2 includes a truck frame 2A, drive wheels 2B provided on both left and right sides of the truck frame 2A, idler wheels 2C (only left side is shown in either cases) provided on the both left and right sides of the truck frame 2A at locations on sides opposite to the drive wheels 2B in a front-rear direction, and left and right crawler belts 2D wound between the drive wheels 2B and the idler wheels 2C, respectively. The left and right drive wheels 2B are rotated by wheel drive motors 2E and 2F (see FIG. 6) composed of hydraulic motors, respectively. As a result, the lower traveling structure 2 is made capable of being self-propelled. On the other hand, a circle 2G having a large diameter and a small length is provided on an upper side of a center part of the truck frame 2A. A revolving device 3 is mounted on this circle 2G.

The working mechanism 5 includes a boom 5A mounted on the revolving frame 6 which will be described later, capable of moving upward/downward, an arm 5B mounted on a tip end portion of the boom 5A, capable of moving upward/downward, a bucket 5C mounted rotatably on a tip end portion of the arm 5B, and a boom cylinder 5D, an arm cylinder 5E, and a bucket cylinder 5F as a hydraulic actuator for driving them.

The upper revolving structure 4 is provided rotatably on the lower traveling structure 2 and includes the revolving frame 6, a cab 7, a counterweight 8, a housing cover 9, an engine 10, a hydraulic pump 11, an assist power generator/electric motor 12, a cooling fan 17, a heat exchanger 18, and an electric power storage device 19, which will be described later.

Figure 2:
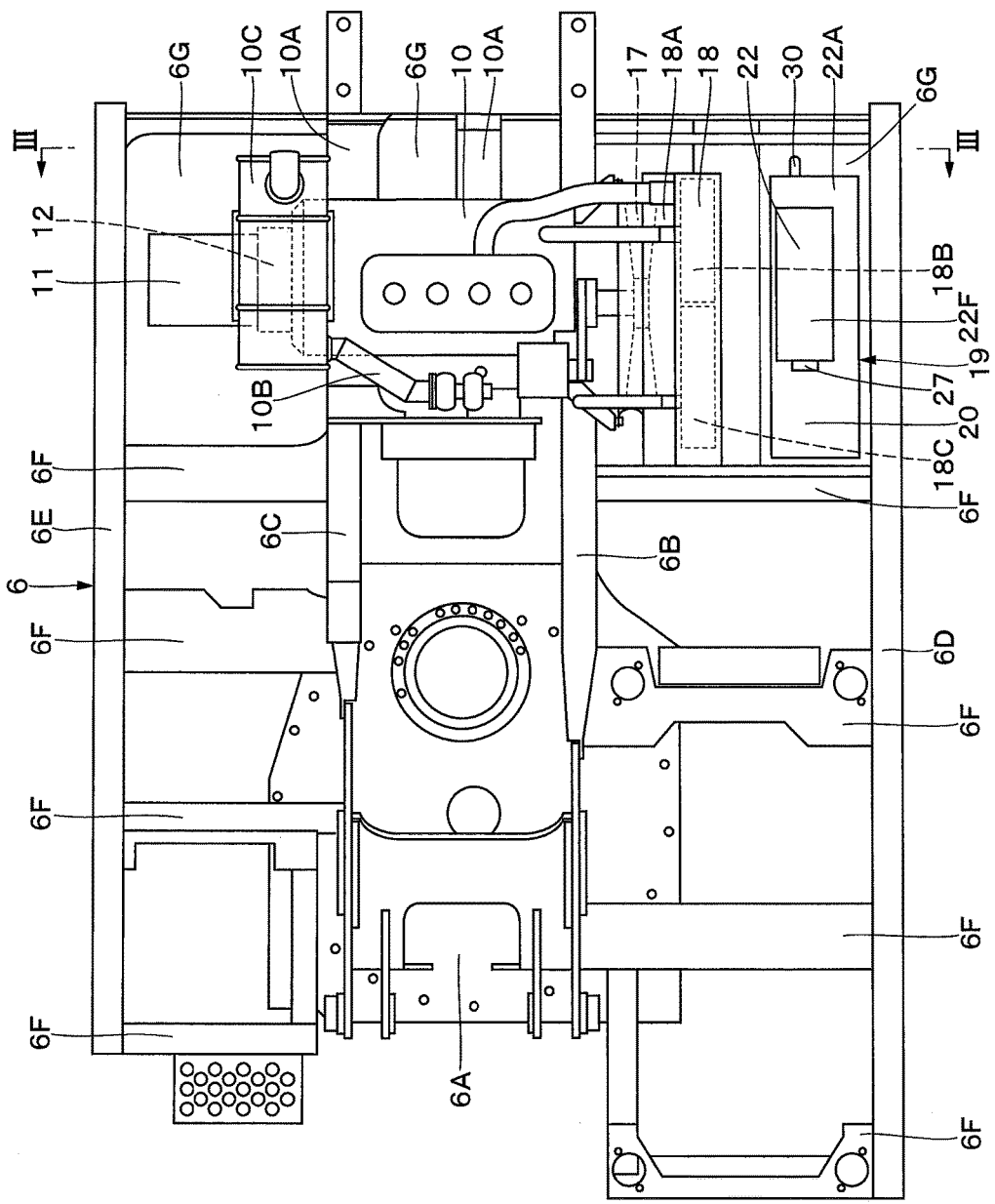
FIG. 2 is a plan view showing a state in which an engine, an assist power generator/electric motor, a hydraulic pump, a heat exchanger, an electric power storage device and the like are mounted on the revolving frame.

The revolving frame 6 is to be abase of the upper revolving structure 4, and the revolving frame 6 is formed as a support structural body. As shown in FIG. 2, the revolving frame 6 includes a bottom plate 6A made of a thick steel plate or the like and extending in the front-rear direction, a left vertical plate 6B and a right vertical plate 6C installed upright on the bottom plate 6A and extending in the front-rear direction at predetermined intervals in a left-right direction, a left side frame 6D and a right side frame 6E arranged on left and right of each of the vertical plates 6B and 6C at an interval and extending in the front-rear direction, a plurality of extension beams 6F extending in the left-right direction from the bottom plate 6A and each of the vertical plates 6B and 6C and supporting the left and right side frames 6D and 6E on their tip end portions, and a plurality of undercovers 6G provided between the bottom plate 6A and each of the side frames 6D and 6E and between the left vertical plate 6B and the right vertical plate 6C on a rear side of the bottom plate 6A. The undercover 6G constitutes a lower surface of the revolving frame 6 together with the bottom plate 6A.

The cab 7 is provided on a front left side of the revolving frame 6, and this cab 7 is for an operator to get on. Inside the cab 7, an operator's seat on which the operator is seated, various operation levers, an indoor unit of an air conditioning device and the like (none of them is shown) are disposed. The counterweight 8 is mounted on a rear end portion of the revolving frame 6, and the counterweight 8 is formed as a heavy article so as to take a weight balance with the working mechanism 5.

Figure 3:
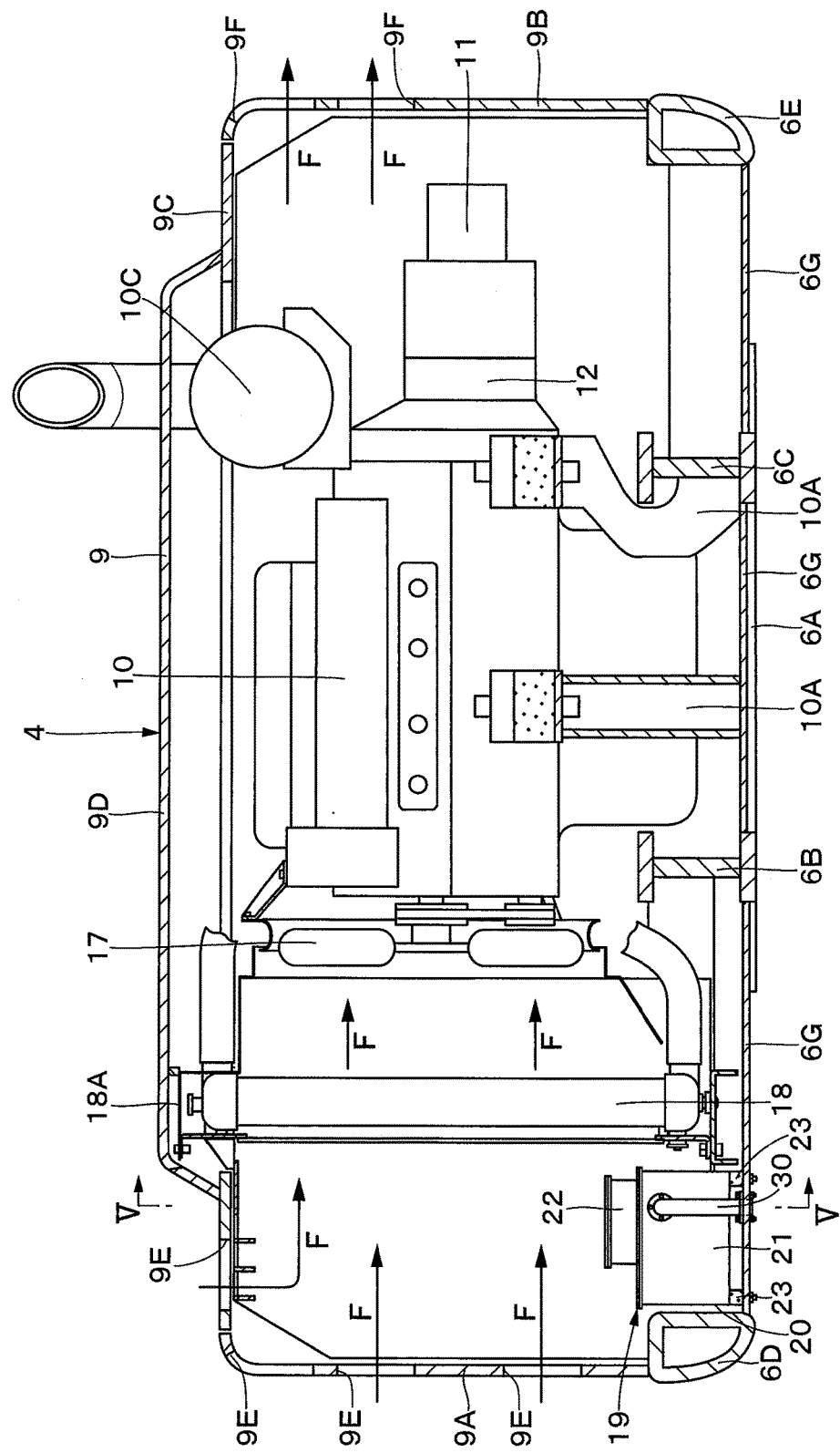
FIG. 3 is a sectional view of the engine, the assist power generator/electric motor, the hydraulic pump, the heat exchanger, the electric power storage device and the like in FIG. 2 when seen from an arrow III-III direction.

The housing cover 9 is provided on the revolving frame 6 at a location between the cab 7 and the counterweight 8. As shown in FIG. 3, this housing cover 9 includes a left side surface plate 9A and a right side surface plate 9B located on the both left and right sides of the revolving frame 6 and extending in the front-rear direction, an upper surface plate 9C extending in a horizontal direction between upper end portions of the side surface plates 9A and 9B, and an engine cover 9D covering an opening portion of the upper surface plate 9C. The left side surface plate 9A of the housing cover 9 has an inlet port 9E formed into which a cooling air F to be supplied to the heat exchanger 18 which will be described later is made to flow to the outside. An outlet port 9F out of which the cooling air F having passed through the engine 10 and the like which will be described later is made to flow formed in the right side surface plate 9B. Here, the housing cover 9 defines a machine room for accommodating the engine 10 which will be described later, the hydraulic pump 11 and the like.

The engine 10 is disposed on the rear part side of the revolving frame 6 at a location on a front side of the counterweight 8. The engine 10 extends above the left and right vertical plates 6B and 6C of the revolving frame 6 in the left-right direction and is arranged on an engine mount 10A in a laterally placed state through a vibration isolating mount. As shown in FIG. 2, an exhaust pipe 10B for exhausting an exhaust gas is provided on the engine 10. An exhaust gas post-treatment device 10C is provided at a location on the right side of the engine 10 on this exhaust pipe 10B. The exhaust gas post-treatment device 10C can remove harmful substances in the exhaust gas exhausted from the engine 10.

The hydraulic pump 11 is connected to a right end side of the engine 10. This hydraulic pump 11 is provided with its input shaft coaxially with an output shaft of the engine 10 and is driven by the engine 10. As a result, the hydraulic pump 11 supplies a pressurized oil to the hydraulic actuator including each of the wheel drive motors 2E and 2F of the lower traveling structure 2 and each of the cylinders 5D, 5E, and 5F of the working mechanism 5.

The assist power generator/electric motor 12 is located on the right side of the engine 10 and coupled between the engine 10 and the hydraulic pump 11. This assist power generator/electric motor 12 is connected to the output shaft of the engine 10 and the input shaft of the hydraulic pump 11 and performs a power generator action and an electric motor action. That is, the assist power generator/electric motor 12 generates power by being rotated by the engine 10 or assists driving of the hydraulic pump 11 in addition to the engine 10. Thus, the assist power generator/electric motor 12 is electrically connected to an assist inverter 14 through a three-phase AC cable (see FIG. 6).

A revolving power generator/electric motor 15 constitutes a power source of the revolving device 3. This revolving power generator/electric motor 15 is composed of an electric motor mounted substantially at a center part of the bottom plate 6A of the revolving frame 6 and has a gear (not shown) meshed with the revolving device 3 through a reduction mechanism 15A. The revolving power generator/electric motor 15 is to cause the upper revolving structure 4 to revolve on the lower traveling structure 2 through the revolving device 3 by rotating the gear by power feed from the electric power storage device 19 which will be described later. On the other hand, the revolving power generator/electric motor 15 can store regenerative energy generated when a revolving operation is decelerated in the electric power storage device 19. The revolving power generator/electric motor 15 is electrically connected to a revolving inverter 16 through the three-phase AC cable 13 (see FIG. 6).

In this case, the hydraulic excavator 1 is driven by selecting the engine 10, the assist power generator/electric motor 12 and the revolving power generator/electric motor 15 in accordance with its operation. In a heavy load state, for example, in which the hydraulic excavator 1 performs an excavating work and the like, the hydraulic pump 11 is driven by an output of the engine 10, the assist power generator/electric motor 12 is driven by electric power of the electric power storage device 19 which will be described later so as to assist the engine 10. On the other hand, in a light load state, for example, an extra output of the engine 10 is converted to electric power by the assist power generator/electric motor 12 and is stored in the electric power storage device 19.

It should be noted that as a power source of the revolving device 3, a revolving hydraulic motor may be used at the same time in addition to the revolving power generator/electric motor 15. For the power source of the revolving device 3, the upper revolving structure 4 may be revolved only by the revolving hydraulic motor instead of the revolving power generator/electric motor 15.

The cooling fan 17 is provided on a left side of the engine 10. This cooling fan 17 is coupled with the output shaft (crank shaft) of the engine 10 and is rotated by the engine 10 as a power source. As a result, the cooling fan 17 sucks an outside air into the housing cover 9 (upper revolving structure 4) through the inlet port 9E provided in the left side surface plate 9A of the housing cover 9 and supplies this outside air as the cooling air F to the engine 10 and the heat exchanger 18 which will be described later.

The heat exchanger 18 is provided on the revolving frame 6 at a location closer to an upstream side in a flow direction of the cooling air F than the cooling fan 17. As shown in FIG. 2 and FIG. 3, the heat exchanger 18 is formed as a single unit including a support frame 18A, a radiator 18B supported by the support frame 18A, and an oil cooler 18C and moreover, the heat exchanger 18 is detachably mounted on the revolving frame 6. In this case, the heat exchanger 18 is provided by facing the cooling fan 17 and cools heated liquids (fluids) such as engine cooling water, hydraulic oil and the like.

Specifically, the radiator 18B cools the heated engine cooling water by radiating heat of the engine cooling water circulating between the radiator 18B and a water jacket of the engine 10 into the cooling air F. The oil cooler 18C cools the heated hydraulic oil by radiating heat of a hydraulic oil (return oil) returning from the various hydraulic actuators mounted on the hydraulic excavator 1 to a hydraulic oil tank 33 which will be described later into the cooling air F.

Subsequently, the electric power storage device 19 according to the first embodiment will be described.

The electric power storage device 19 is disposed on the revolving frame at a location closer to the upstream side in the flow direction of the cooling air F than the heat exchanger 18. That is, the electric power storage device 19 is located between the left side surface plate 9A of the housing cover 9 and the heat exchanger 18. This electric power storage device 19 is constituted as a water-cooling or air-cooling electric power storage device, for example. The electric power storage device 19 charges generated power by the assist power generator/electric motor 12 and the revolving power generator/electric motor 15 or discharges the charged power to the assist power generator/electric motor 12 and the revolving power generator/electric motor 15. The electric power storage device 19 includes a casing 20, a battery control unit 25, a junction box 26, and a battery module 29.

The casing 20 constitutes an outer wall of the electric power storage device 19 and this casing 20 is formed by a lower box body 21 located on the undercover 6G of the revolving frame 6 and an upper box body 22 located on an upper side of the lower box body 21. That is, the casing 20 is formed in two stages, that is, an upper stage and a lower stage. Moreover, the casing 20 is formed by a metal material such as an iron material, an aluminum material and the like, for example, as a firm outer wall.

The lower box body 21 is formed by a lower plate 21A having a rectangular shape constituting a bottom part, a front plate 21B installed upright from a front end side of the lower plate 21A upward, a rear plate 21C faced with the front plate 21B and installed upright from a rear end side of the lower plate 21A upward, and a left side plate 21D and a right side plate 21E closing both sides of the lower box body 21 in the left-right direction. As a result, the lower box body 21 is generally formed having a box shape opened upward and elongated in the front-rear direction. An internal space of the lower box body 21 is defined into two stages, that is, an upper stage and a lower stage by an intermediate plate 21F.

A chamber on the upper side of the lower box body 21 is a battery chamber A in which a battery module 29 which will be described later is disposed. On the other hand, a chamber on the lower side of the lower box body 21 is a cooling chamber B through which a cooling medium such as a liquid, a cooling air and the like for cooling the battery module 29 flows.

Figure 4:
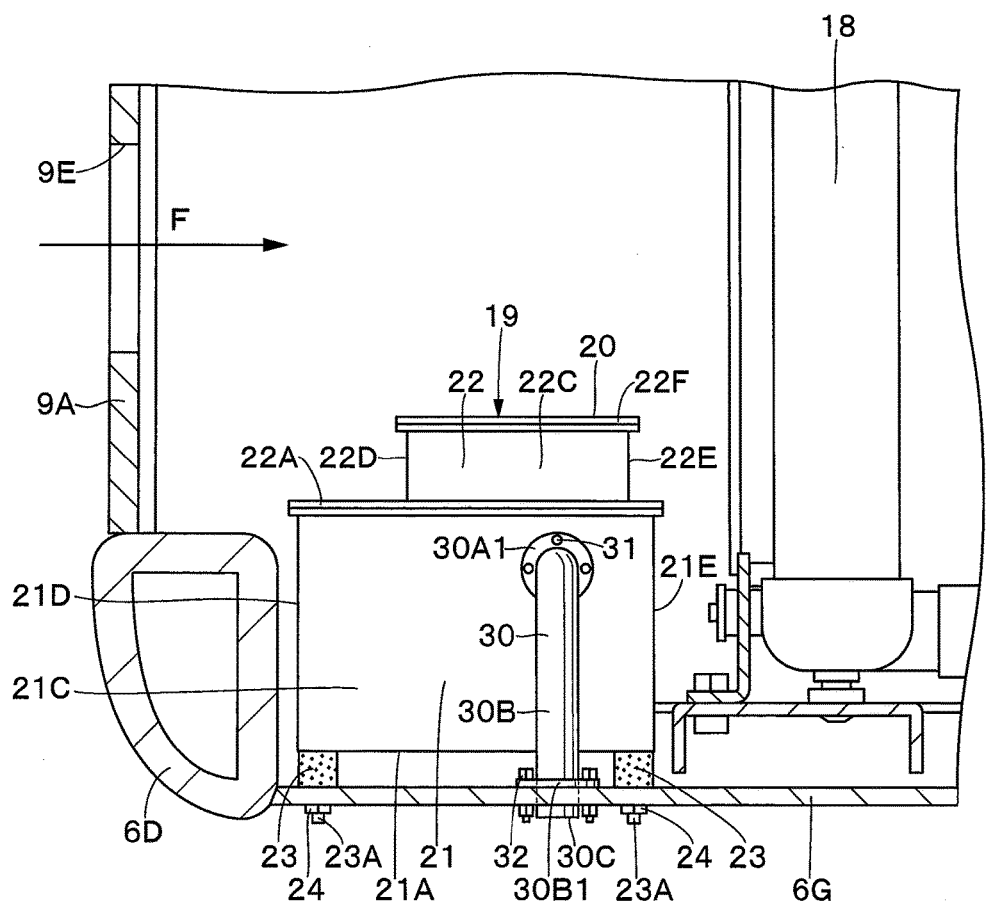
FIG. 4 is an enlarged view of an essential part showing the electric power storage device in FIG. 3 in an enlarged manner.
Figure 5:
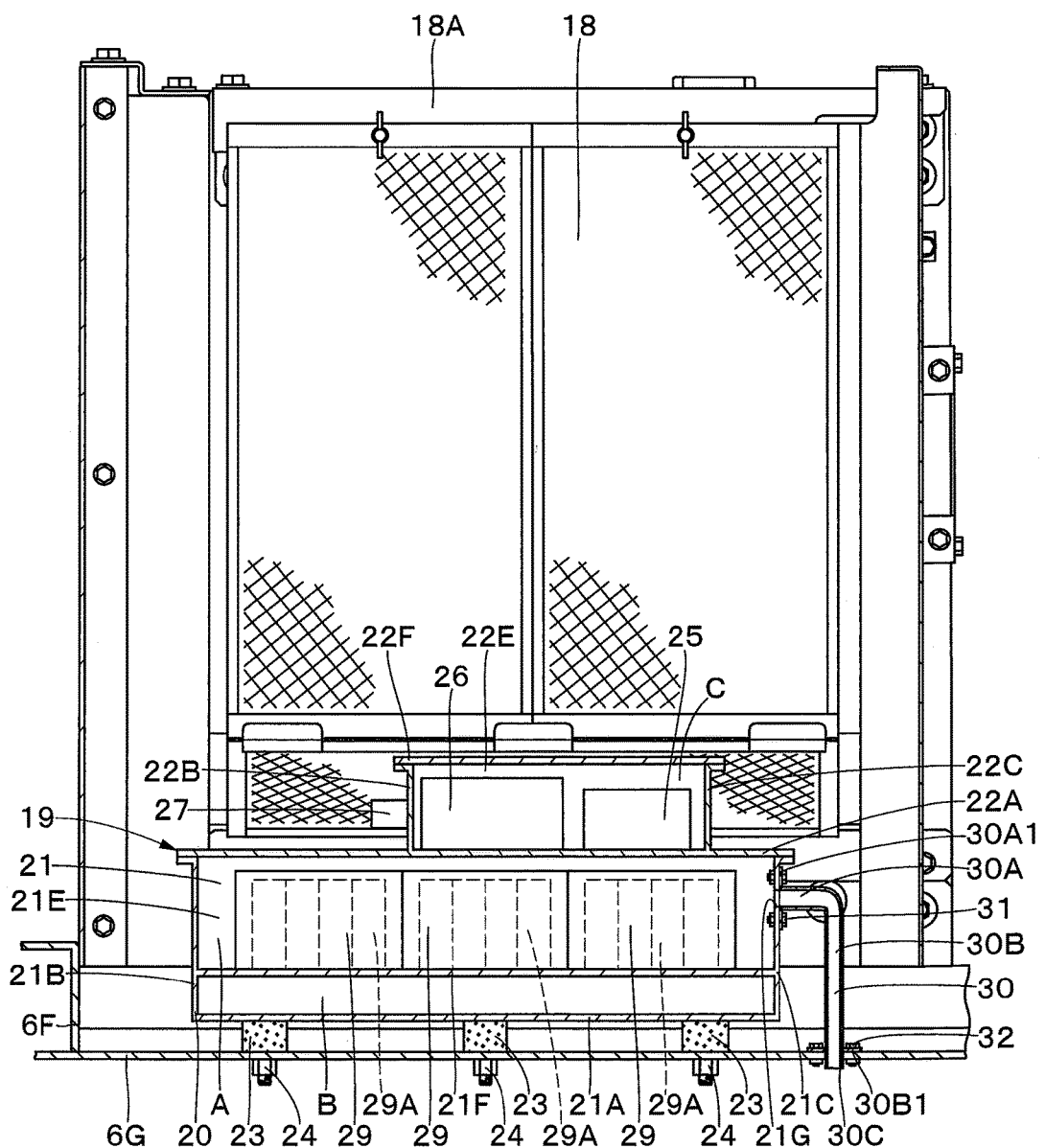
FIG. 5 is a sectional view of the electric power storage device and the heat exchanger in FIG. 3 when seen from an arrow V-V direction.

As shown in FIG. 4 and FIG. 5, a plurality of (six, for example) vibration isolating members 23 are provided on the lower plate 21A. The lower box body 21 is mounted on the undercover 6G of the revolving frame 6 by screwing each nut 24 to each male screw portion 23A of each vibration isolating member 23, respectively. As shown in FIG. 5, a through hole 21G penetrating in a thickness direction of the rear plate 21C is drilled on an upper end side in the rear plate 21C of the lower box body 21. An electrolyte discharge pipe 30 which will be described later is mounted on this through hole 21G. A safety valve (not shown) opened when an air pressure (internal pressure) in the casing 20 rises may be provided on this through hole 21G.

On the other hand, the upper box body 22 located on the upper side of the lower box body 21 is formed by a lower plate 22A placed on an upper end of the lower box body 21, a front plate 22B installed upright from a location slightly closer to a front side than a center part of the lower plate 22A upward, a rear plate 22C faced with the front plate 22B and installed upright from a rear end side of the lower plate 22A upward, a left side plate 22D and a right side plate 22E closing both sides in the left-right direction of the upper box body 22, and an upper plate 22F placed on upper ends of the front plate 22B, the rear plate 22C, the left side plate 22D, and the right side plate 22E. The upper box body 22 is formed having a box shape smaller than the lower box body 21. As shown in FIG. 5, an internal space of the upper box body 22 is a control chamber C. The battery control unit 25 for controlling input/output of electric power of a battery cell 29A which will be described later, a junction box 26 to which various wirings are connected and the like are disposed in this control chamber C.

The lower plate 22A of the upper box body 22 is formed slightly larger than the lower plate 21A of the lower box body 21 and acts as a lid body closing an opening of the lower box body 21 on the upper end side. That is, the lower plate 22A of the upper box body 22 is screwed with the upper end side of the lower box body 21 by a bolt, a nut and the like, not shown. As a result, the battery chamber A of the lower box body 21 is configured to be sealed. The upper plate 22F of the upper box body 22 acts as a lid body closing an opening of the upper box body 22 on the upper end side. That is, the upper plate 22F is screwed with the upper end sides of the front plate 22B, the rear plate 22C, the left side plate 22D and the right side plate 22E by a bolt, a nut and the like, not shown. As a result, the control chamber C of the upper box body 22 is configured to be sealed.

A connector 27 is provided on the front plate 22B of the upper box body 22 by protruding forward. The electric power storage device 19 is electrically connected to the assist inverter 14 and the revolving inverter 16 through a cable 28 connected to the connector 27 (see FIG. 6).

The battery modules 29 are disposed in plural on the intermediate plate 21F in the battery chamber A of the lower box body 21. These battery modules 29 are constituted as lithium ion batteries, for example, and electrically connected in a serial state. A plurality of battery cells 29A are electrically connected in a serial state in each of the battery modules 29 (see FIG. 5). Each of the battery cells 29A is provided with a cylindrical body formed by a cylindrical aluminum alloy and an electrode group, an electrolyte (none of them is shown) and the like inside the cylindrical body, for example. In this case, the cylindrical body of the battery cell 29A is sealed so that the electrolyte therein does not leak to the outside. A safety valve (not shown) opened when the internal pressure rises due to overcharging or the like is provided on the cylindrical body of the battery cell 29A. It should be noted that the battery module 29 may be other batteries such as a nickel-hydrogen battery or the like instead of the lithium ion battery.

Subsequently, the electrolyte discharge pipe 30 according to the first embodiment will be described.

The electrolyte discharge pipe 30 has its base end side connected to the casing 20 of the electric power storage device 19. The electrolyte discharge pipe 30 has its distal end side opened toward the undercover 6G side (downward) of the revolving frame 6. This electrolyte discharge pipe 30 is formed as a pipe made of a metal material, a resin material or the like having a substantially L-shape. Specifically, as shown in FIG. 5, the electrolyte discharge pipe 30 is formed by a horizontal pipe part 30A extending rearward from a rear plate 21C of the lower box body 21 and a vertical pipe part 30B bent from the horizontal pipe part 30A toward the undercover 6G side (downward). As shown in FIG. 4 and FIG. 5, a flange portion 30A1 is provided on the base end side of the horizontal pipe part 30A. On the other hand, a flange portion 30B1 is provided on the distal end side of the vertical pipe part 30B.

The base end side of the electrolyte discharge pipe 30 is mounted on the through hole 21G of the casing 20 (lower box body 21) by a bolt 31 and the like in a state in which the flange portion 30A1 of the horizontal pipe part 30A abuts against the rear plate 21C of the lower box body 21. On the other hand, the distal end side of the electrolyte discharge pipe 30 is mounted by a bolt 32 or the like by having the flange portion 30B1 of the vertical pipe part 30B abut against the undercover 6G of the revolving frame 6 on which the electric power storage device 19 is placed. In this case, the distal end of the vertical pipe part 30B penetrates the undercover 6G, and its distal end opening 30C is opened downward.

As a result, the electrolyte discharge pipe 30 can discharge an electrolyte component injected from the battery cell 29A to an outside of the upper revolving structure 4 (vehicle body) at abnormality (at overcharging, for example) of each battery module 29 (each battery cell 29A) disposed in the battery chamber A of the lower box body 21. A concentration reduction filter (not shown) for reducing the concentration of the electrolyte component may be mounted on the distal end opening 30C of the electrolyte discharge pipe 30.

Figure 6:
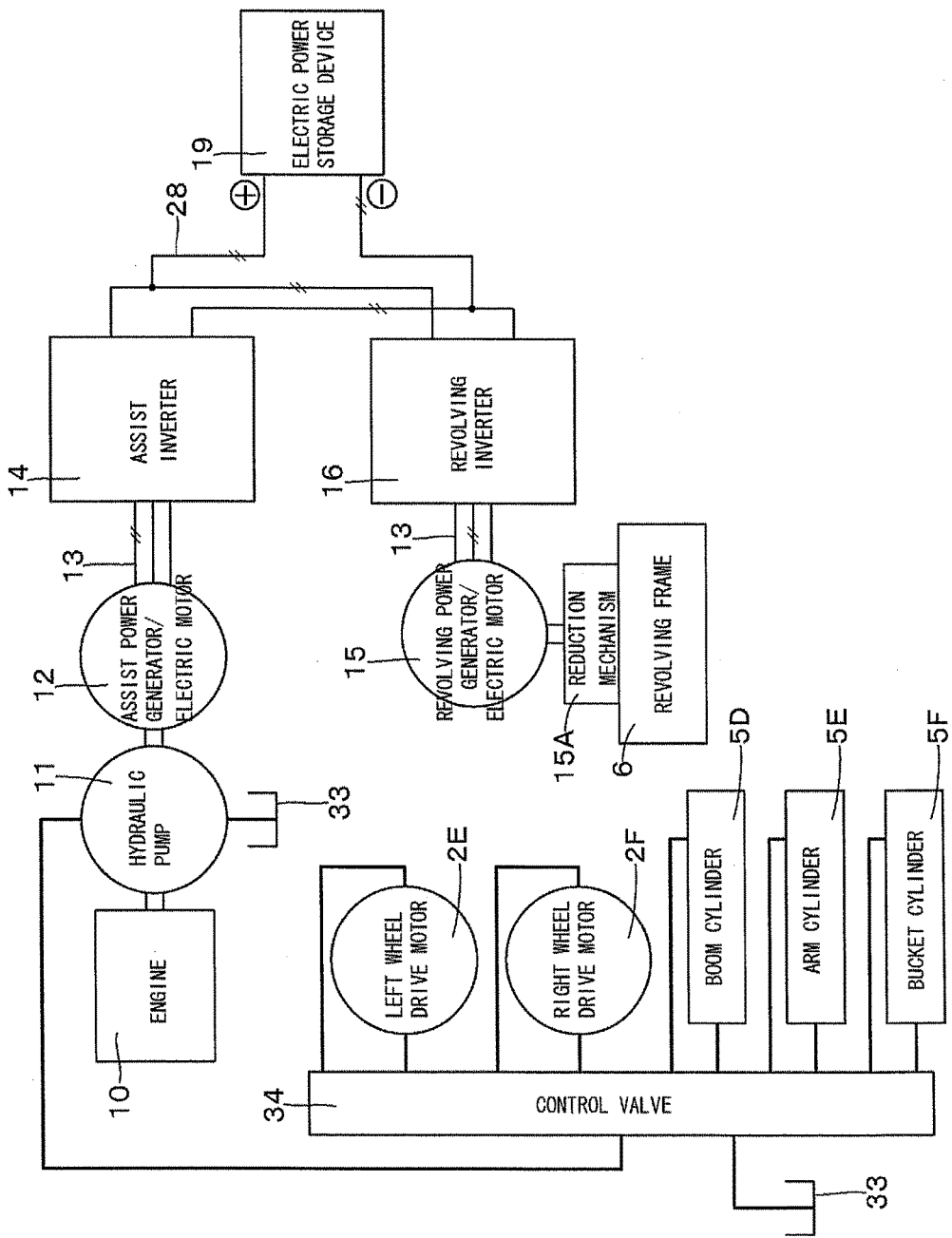
FIG. 6 is a configuration diagram showing an operation system of a hybrid-type hydraulic excavator.

The hydraulic oil tank 33 shown in FIG. 6 stores the hydraulic oil to be supplied to the hydraulic pump 11. A control valve 34 is constituted by a plurality of directional control valves for controlling the wheel drive motors 2E and 2F of the lower traveling structure 2 and each of the cylinders 5D, 5E, and 5F of the working mechanism 5. This control valve 34 is to control supply/discharge and stop of the pressurized oil supplied from the hydraulic pump 11 with respect to the wheel drive motors 2E and 2F and each of the cylinders 5D, 5E, and 5F of the working mechanism 5 in accordance with an operation of an operation lever (not shown) for work.

The hydraulic excavator 1 according to the first embodiment has the configuration as described above, and this hydraulic excavator 1 is self-propelled to a work site by the lower traveling structure 2 and performs an excavating work of earth and sand by using the working mechanism 5 while the upper revolving structure 4 is revolved by the revolving device 3.

In this case, in a state in which the hydraulic excavator 1 is operated, the cooling fan 17 is driven by the engine 10, and the cooling fan 17 causes the outside air to flow in through the inlet port 9E provided in the left side surface plate 9A of the housing cover 9. This outside air can cool the fluid (liquid) to be cooled, respectively, by being supplied as the cooling air F to the heat exchanger 18 (the radiator 18B, the oil cooler 18C and the like). The cooling air F having passed the heat exchanger 18 is led to the engine 10 side and flows out to the outside through the outlet port 9F provided in the right side surface plate 9B through peripheries of the engine 10, the hydraulic pump 11, and the assist power generator/electric motor 12.

The assist power generator/electric motor 12 is rotated by the engine 10 so as to generate electric energy. The revolving power generator/electric motor 15 generates electric energy (regenerative energy) when decelerating a revolving operation. Such electric energy is accumulated in the electric power storage device 19 through the cables 13 and 28 (see FIG. 6). The electric energy accumulated in the electric power storage device 19 is supplied to the revolving power generator/electric motor 15 and the assist power generator/electric motor 12, respectively, and is used as auxiliary power for driving the revolving device 3 and the engine 10, respectively.

The electric power storage device 19 has a problem that its heat-resistant temperature is low, and use or storage at a high temperature reduces its life. Thus, the electric power storage device 19 is arranged at a place where the temperature does not rise high easily such as closer to an upstream side in the flow direction of the cooling air F than the heat exchanger 18 or the like in order to suppress temperature rise.

In this case, at abnormality caused by overcharging or the like of the electric power storage device 19, for example, the electrolyte might be injected in a high-temperature mist state from the safety valve (not shown) of the battery module 29 (battery cell 29A). If this injected electrolyte component is discharged from the safety valve of the casing 20, there is a concern that the electrolyte component is brought into contact with the devices such as the heat exchanger 18, the engine 10, the assist power generator/electric motor 12, the hydraulic pump 11 and the like by flowing with the flow of the cooling air F. As a result, such a problem is caused that the lives of these devices are reduced.

Thus, in this embodiment, the electrolyte discharge pipe 30 is provided on the casing 20 of the electric power storage device 19. This electrolyte discharge pipe 30 is configured to discharge (lead) the electrolyte component injected from the battery module 29 at abnormality caused by overcharging or the like of the battery module 29 (battery cell 29A) to the outside of the upper revolving structure 4 (vehicle body).

The electrolyte discharge pipe 30 is formed having a substantially L-shape by the horizontal pipe part 30A and the vertical pipe part 30B. The base end side of the electrolyte discharge pipe 30 is connected to the through hole 21G provided on the rear plate 21C of the casing 20 constituting the electric power storage device 19. On the other hand, the distal end side of the electrolyte discharge pipe 30 penetrates the undercover 6G of the revolving frame 6. That is, the electrolyte discharge pipe 30 allows the inside of the battery chamber A in which the plurality of the battery modules 29 are disposed in the casing 20 and the outside of the vehicle body to communicate with each other.

Thus, according to the first embodiment, even if the electrolyte component is injected from the battery module 29 of the electric power storage device 19 into the battery chamber A, this electrolyte component is discharged to the outside of the upper revolving structure 4 (vehicle body) by the electrolyte discharge pipe 30 provided on the casing 20 of the electric power storage device 19. Therefore, contact of the electrolyte component with the heat exchanger 18, the engine 10 and the like can be suppressed. As a result, the lives of the devices such as the heat exchanger 18, the engine 10 and the like can be prolonged.

Moreover, the distal end opening 30C of the electrolyte discharge pipe 30 is opened downward (toward the ground side) of the vehicle body. Therefore, dispersion of the electrolyte component discharged from the distal end opening 30C of the electrolyte discharge pipe 30 to the periphery can be suppressed even if the hydraulic excavator 1 is revolved. As a result, contact of the electrolyte component with the devices in the periphery of the hydraulic excavator 1, the working workers and the like can be suppressed. The battery module 29 of the electric power storage device 19 is constituted as a lithium ion battery. As a result, since the electric power storage device 19 can have a large capacity, size reduction of the electric power storage device 19 can be realized.

Figure 7:
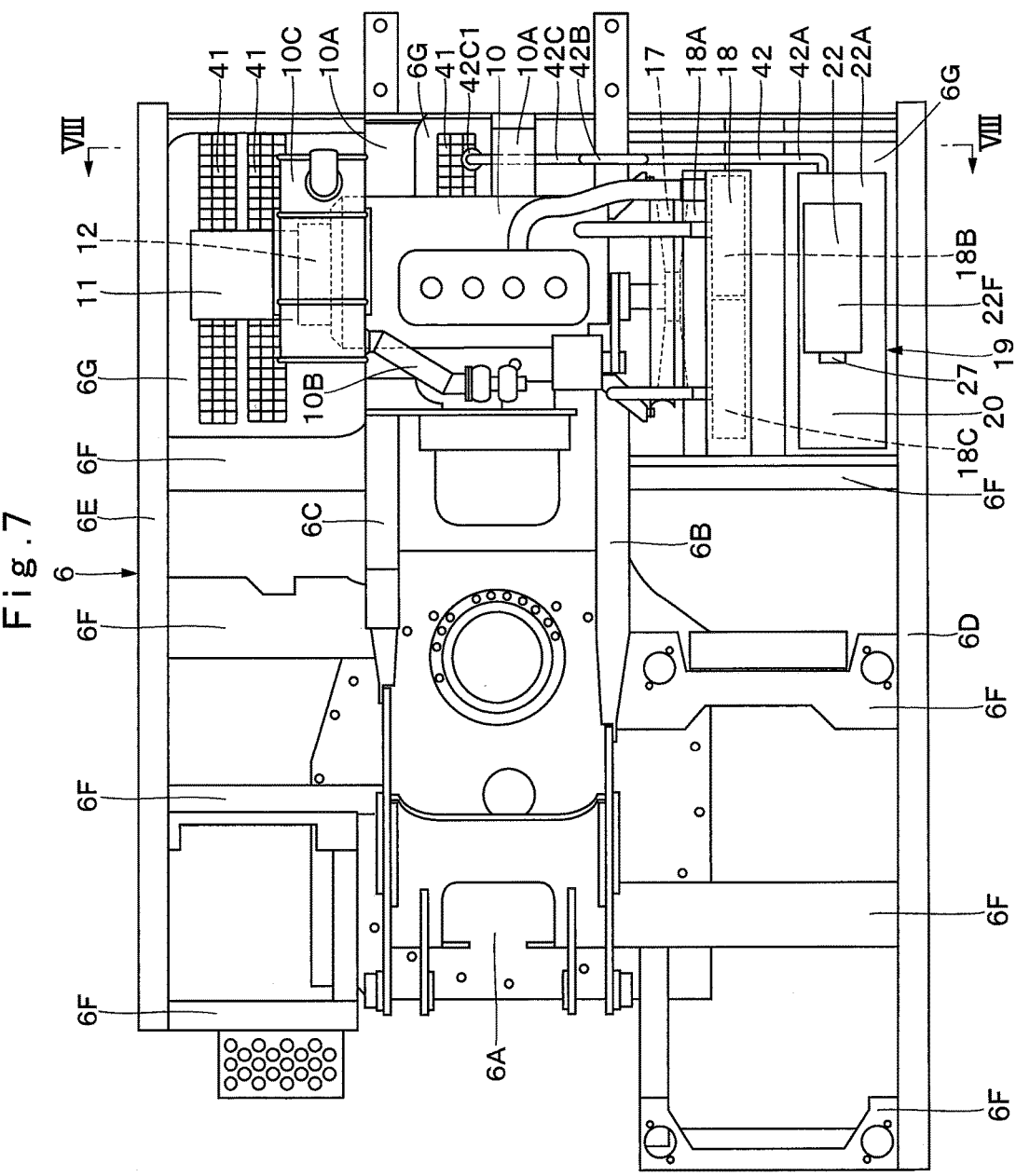
FIG. 7 is a plan view similar to FIG. 2 showing a hydraulic excavator according to a second embodiment of the present invention.
Figure 8:
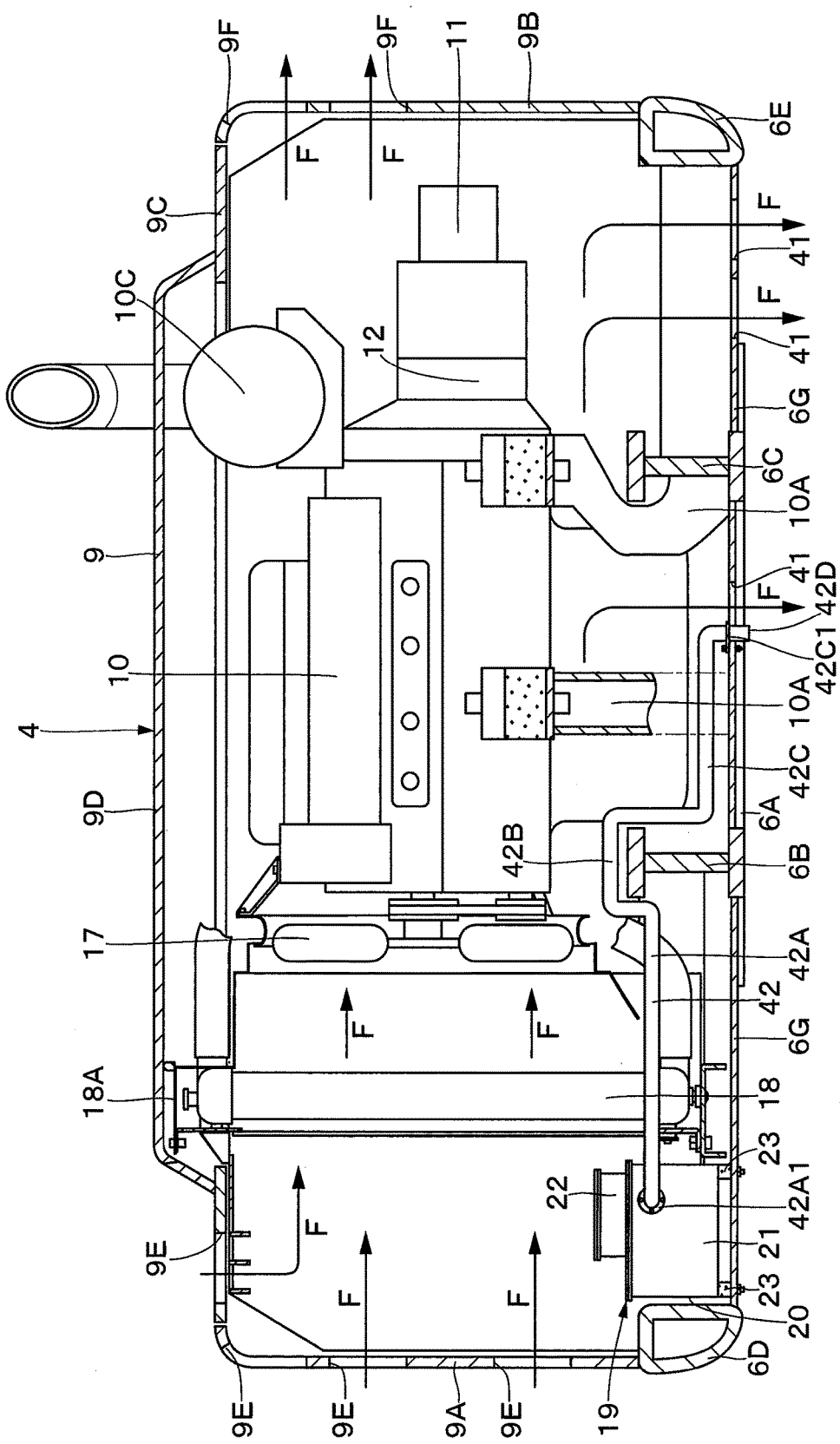
FIG. 8 is a sectional view similar to FIG. 3 when seen from an arrow VIII-VIII direction in FIG. 7.

Subsequently, FIG. 7 and FIG. 8 show a second embodiment of the present invention. A feature of the second embodiment is that the distal end side of the electrolyte discharge pipe is arranged at the outlet port provided in the undercover located below the engine. It should be noted that in the second embodiment, component elements that are identical to those in the foregoing first embodiment will simply denoted by the same numerals to avoid repetitions of similar explanations.

Cooling air discharge ports 41 are provided in plural in the undercover 6G at locations below the engine 10. These cooling air discharge ports 41 are constituted as discharge ports of the cooling air F. Each of the cooling air discharge port 41 is to discharge the cooling air F introduced into the upper revolving structure 4 through the inlet port 9E provided in the left side surface plate 9A of the housing cover 9 to below the revolving frame 6.

That is, by means of driving of the cooling fan 17, the cooling air F flowing in through the inlet port 9E of the left side surface plate 9A is led to the engine 10 side through the heat exchanger 18. After that, the cooling air F is discharged from the cooling air discharge port 41 provided in the undercover 6G and the outlet port 9F formed in the right side surface plate 9B to the outside. Therefore, in the cooling air discharge port 41, the cooling air F flows from inside the upper revolving structure 4 to the outside. Here, in the plurality of the cooling air discharge ports 41, at the cooling air discharge port 41 provided between the left vertical plate 6B and the right vertical plate 6C, a distal end opening 42D of an electrolyte discharge pipe 42 which will be described later is arranged.

The electrolyte discharge pipe 42 is used instead of the electrolyte discharge pipe 30 according to the first embodiment. The base end side of this electrolyte discharge pipe 42 is connected to the casing 20 of the electric power storage device 19. On the other hand, the distal end side of the electrolyte discharge pipe 42 is arranged in the cooling air discharge port 41 at a position avoiding the engine 10. Specifically, the electrolyte discharge pipe 42 is constituted by a first pipe part 42A extending rearward from the through hole 21G provided in the rear plate 21C of the lower box body 21 of the casing 20, bending at a middle portion and extending toward the left vertical plate 6B, a second pipe part 42B extending upward from the first pipe part 42A and bending with a substantially inverted U-shape and crossing above the left vertical plate 6B, and a third pipe part 42C extending to the right side in the left-right direction from the second pipe part 42B, crossing the front side of the engine mount 10A while avoiding the engine 10 and bending downward at a position corresponding to the cooling air discharge port 41.

In this case, a flange portion 42A1 is provided on the base end side of the first pipe part 42A. On the other hand, a flange portion 42C1 is provided on the distal end side of the third pipe part 42C. At middle portions of the first pipe part 42A, the second pipe part 42B, and the third pipe part 42C, support brackets, not shown, supporting each of the pipeline portions 42A, 42B, and 42C on the revolving frame 6, respectively, are provided.

The electrolyte discharge pipe 42 is mounted on the through hole 21G of the casing 20 (lower box body 21) by a bolt or the like by bringing the flange portion 42A1 of the first pipe part 42A into contact with the rear plate 21C of the lower box body 21. On the other hand, the electrolyte discharge pipe 42 is mounted on the cooling air discharge port 41 by a bolt or the like by bringing the flange portion 42C1 of the third pipe part 42C into contact with the undercover G of the revolving frame 6 located below the engine 10. In this case, the distal end of the third pipe part 42C is arranged in the cooling air discharge port 41, and its distal end opening 42D is opened downward (toward the ground).

As a result, the electrolyte component injected from the battery module 29 (battery cell 29A) of the electric power storage device 19 flows through the electrolyte discharge pipe 42 and reaches the distal end opening 42D of the third pipe part 42C arranged in the cooling air discharge port 41. In this case, in the cooling air discharge port 41, the cooling air F flows from inside the upper revolving structure 4 toward below the vehicle body. As a result, the electrolyte component having reached the distal end opening 42D of the third pipe part 42C is discharged to the outside of the vehicle body by flowing with the flow of the cooling air F. The concentration reduction filter (not shown) for reducing the concentration of the electrolyte component may be mounted on the distal end opening 42D of the electrolyte discharge pipe 42.

Thus, in the second embodiment configured as above, the distal end side of the electrolyte discharge pipe 42 is arranged in the cooling air discharge port 41 of the cooling air F. Therefore, the electrolyte component can be discharged with the flow of the cooling air F flowing at the distal end opening 42D of the electrolyte discharge pipe 42 from inside the upper revolving structure 4 (vehicle body) to the outside. As a result, the electrolyte component can be prevented from staying (stagnating) at the distal end opening 42D of the electrolyte discharge pipe 42. Therefore, the electrolyte component can be discharged efficiently, and its temperature rise can be suppressed. In the cooling air discharge port 41, the cooling air F flows from inside the upper revolving structure 4 to below the vehicle body. As a result, backflow of the electrolyte component discharged from the cooling air discharge port 41 so as to be in contact with the heat exchanger 18, the engine 10 and the like can be suppressed.

The distal end opening 42D of the electrolyte discharge pipe 42 is arranged in the cooling air discharge port 41 provided at a position away from the inlet port 9E of the cooling air F. As a result, entry of the discharged electrolyte component through the inlet port 9E of the left side surface plate 9A can be reduced. Since the electrolyte component is discharged in a state diffused along the flow of the cooling air F, the electrolyte component can be diluted. As a result, the influence to the periphery of the hydraulic excavator 1 can be reduced. Moreover, the electrolyte discharge pipe 42 is formed by a bent pipeline by the first pipe part 42A, the second pipe part 42B, and the third pipe part 42C. As a result, vigorous discharge of the electrolyte component injected from the casing 20 from the distal end opening 42D to the outside can be suppressed.

Figure 9:
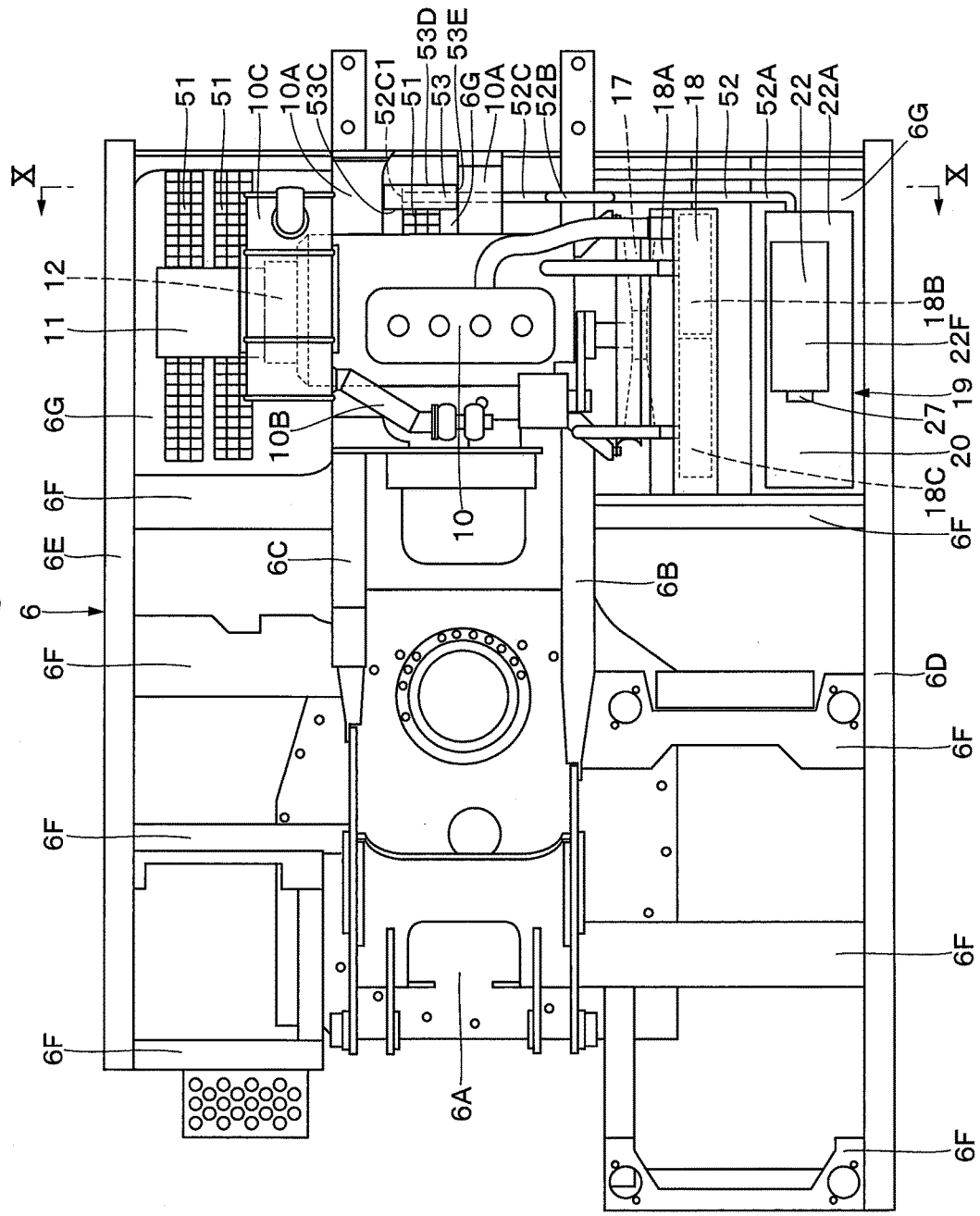
FIG. 9 is a plan view similar to FIG. 2 showing a hydraulic excavator according to a third embodiment of the present invention.
Figure 10:
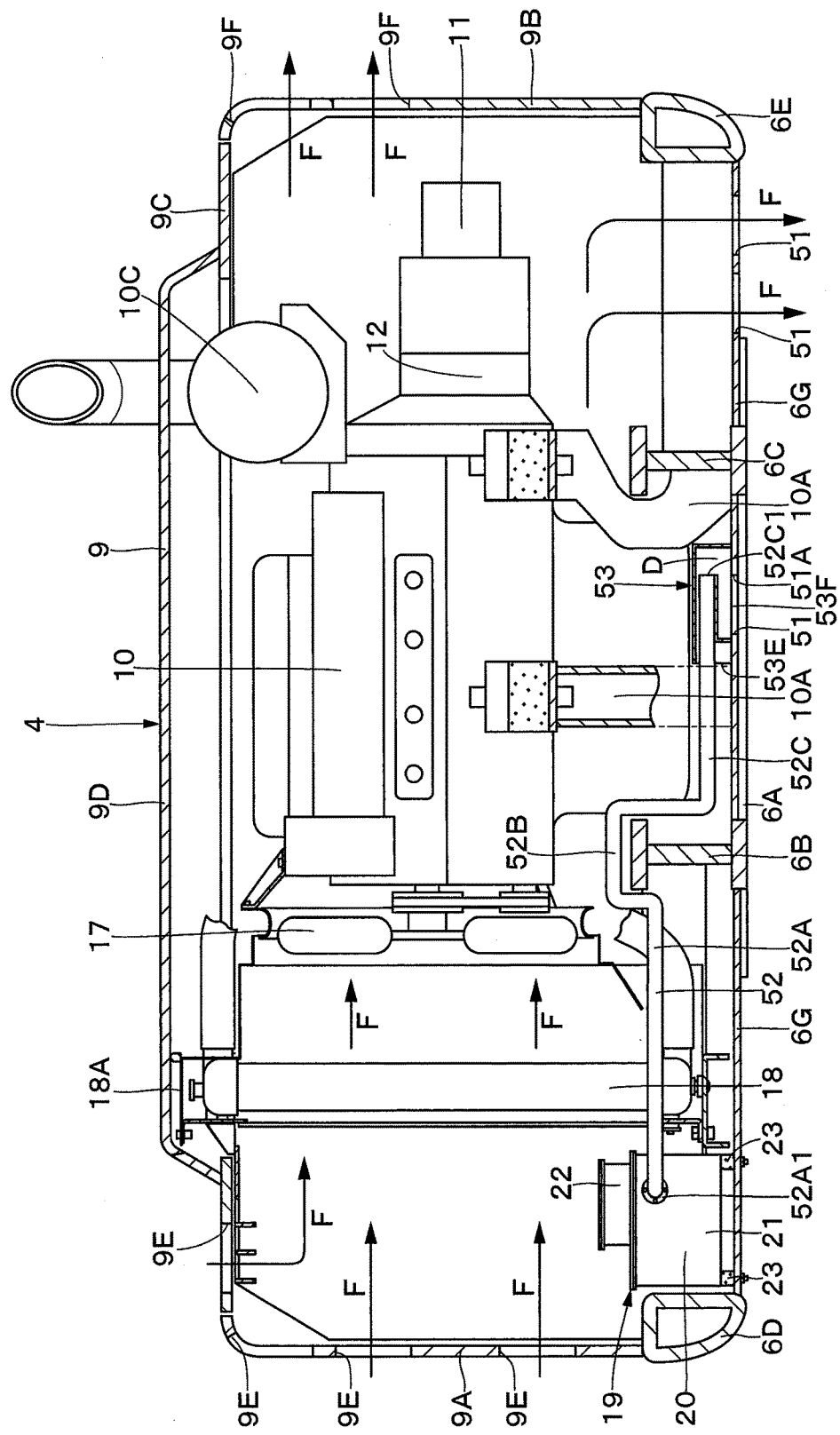
FIG. 10 is a sectional view similar to FIG. 3 when seen from an arrow X-X direction in FIG. 9.

Subsequently, FIG. 9 to FIG. 11 show a third embodiment of the present invention. A feature of the third embodiment is that a closed box body forming an electrolyte discharge chamber is provided at a position corresponding to the discharge port of the undercover. It is configured such that the electrolyte mist and/or electrolyte is discharged from the discharge port to the outside through the electrolyte discharge chamber. It should be noted that in the third embodiment, component elements that are identical to those in the foregoing first embodiment will simply denoted by the same numerals to avoid repetitions of similar explanations.

Cooling air discharge ports 51 are provided in plural in the undercover 6G located below the engine 10. These cooling air discharge ports 51 are configured as discharge ports of the cooling air F. Each of the cooling air discharge ports 51 discharges the cooling air F introduced into the upper revolving structure 4 from the inlet port 9E provided in the left side surface plate 9A of the housing cover 9 to below the revolving frame 6. The cooling air F flowing in from the inlet port 9E of the left side surface plate 9A is led to the engine 10 side passing through the heat exchanger 18. After that, the cooling air F is discharged from the cooling air discharge port 51 provided in the undercover 6G and the outlet port 9F formed in the right side surface plate 9B to the outside.

Here, in the plurality of the cooling air discharge ports 51, on a rear end side of the cooling air discharge port 51 formed between the left vertical plate 6B and the right vertical plate 6C, a closed box body 53 which will be described later is provided so as to cover the rear end side. That is, the rear end side of this cooling air discharge port 51 is an electrolyte discharge port 51A as an outlet port through which the electrolyte component is discharged to the outside. It may be configured such that the electrolyte component is discharged to the outside through an exclusive outlet port provided separately at the undercover 6G without using the cooling air discharge port 51 of the cooling air F.

An electrolyte discharge pipe 52 is used instead of the electrolyte discharge pipe 30 according to the first embodiment. This electrolyte discharge pipe 52 has its base end side connected to the casing 20 of the electric power storage device 19. On the other hand, a distal end opening 52C1 of the electrolyte discharge pipe 52 is arranged in the vicinity of the electrolyte discharge port 51A side or just above the electrolyte discharge port 51A, for example. Specifically, the electrolyte discharge pipe 52 is constituted by a first pipe part 52A extending rearward from the through hole 21G provided in the rear plate 21C of the lower box body 21 of the casing 20, bending at a middle portion, and extending toward the left vertical plate 6B, a second pipe part 52B extending upward from the first pipe part 52A and bending with a substantially inverted U-shape and crossing above the left vertical plate 6B, and a third pipe part 52C extending toward the right side in the left-right direction from the second pipe part 52B, crossing the front side of the engine mount 10A while avoiding the engine 10 and having a distal end opening 52C1 arranged in the vicinity of the electrolyte discharge port 51A or just above the electrolyte discharge port 51A, for example.

The electrolyte discharge pipe 52 is mounted on the through hole 21G of the casing 20 (lower box body 21) by a bolt and the like by bringing a flange portion 52A1 of the first pipe part 52A into contact with the rear plate 21C of the lower box body 21. On the other hand, the electrolyte discharge pipe 52 has a distal end side of the third pipe part 52C arranged on a pipe supporting plate) 53B in the electrolyte discharge chamber D of the closed box body 53 which will be described later.

The closed box body 53 is provided between the third pipe part 52C of the electrolyte discharge pipe 52 and the electrolyte discharge port 51A formed in the undercover 6G. This closed box body 53 is constituted by an outer plate body 53A having an L-shaped section, a pipe supporting plate 53B having an L-shaped section located inside the outer plate body 53A, a front plate 53C closing front end sides of the outer plate body 53A and the pipe supporting plate 53B, and a rear plate 53D closing rear end sides of the outer plate body 53A and the pipe supporting plate 53B.

The outer plate body 53A is constituted by a vertical plate 53A1 installed upright from the undercover 6G upward between the electrolyte discharge port 51A and the right vertical plate 6C and a lateral plate 53A2 extending toward the left side in the left-right direction from an upper end of the vertical plate 53A1. The pipe supporting plate 53B is constituted by a vertical plate 53B1 installed upright from the undercover 6G upward at a position close to a distal end side of the electrolyte discharge port 51A and a lateral plate 53B2 extending toward the right side in the left-right direction from an upper end of the vertical plate 53B1 and covering above the electrolyte discharge port 51A.

As shown in FIG. 11, the left-end side opening of the closed box body 53 is a pipe inlet port 53E into which the third pipe part 52C of the electrolyte discharge pipe 52 is inserted. A distal end side of the third pipe part 52C is arranged on the lateral plate 53B2 of the pipe supporting plate 53B. A lower-surface side opening of the closed box body 53 is a discharge opening 53F communicating with the electrolyte discharge port 51A. A space inside the closed box body 53 between the pipe inlet port 53E and the discharge opening 53F is the electrolyte discharge chamber D bent having a substantially U-shaped section.

As a result, the closed box body 53 surrounds the distal end opening 52C1 of the third pipe part 52C and is opened only on the electrolyte discharge port 51A side. The electrolyte component injected into the casing 20 from the battery module 29 (battery cell 29A) of the electric power storage device 19 flows through the electrolyte discharge pipe 52 and is discharged from the distal end opening 52C1 of the third pipe part 52C into the electrolyte discharge chamber D of the closed box body 53 and then, it is discharged from the electrolyte discharge port 51A to the outside of the vehicle body.

In this case, the electrolyte discharge chamber D is bent having a substantially U-shaped section. As a result, the electrolyte component discharged from the distal end opening 52C1 of the third pipe part 52C is discharged from the electrolyte discharge port 51A to the outside of the vehicle body in a state in which it collides with the vertical plate 53A1 of the outer plate body 53A and is diffused. It should be noted that the concentration reduction filter (not shown) for reducing the concentration of the electrolyte component may be mounted on the distal end opening 52C1 of the electrolyte discharge pipe 52 or in the electrolyte discharge chamber D.

Thus, in the third embodiment configured as above, the closed box body 53 opened in the electrolyte discharge port 51A of the revolving frame 6 is provided on the revolving frame 6. The distal end opening 52C1 of the electrolyte discharge pipe 52 is surrounded by the closed box body 53 in which the electrolyte discharge chamber D is formed. As a result, the electrolyte component discharged from the distal end opening 52C1 of the electrolyte discharge pipe 52 is led to the electrolyte discharge port 51A through the electrolyte discharge chamber D of the closed box body 53. Therefore, contact of the electrolyte component with the devices such as the heat exchanger 18, the engine 10 and the like can be suppressed. The closed box body 53 is provided on the electrolyte discharge port 51A. As a result, even if the electrolyte component discharged from the electrolyte discharge port 51A flows backward, it is prevented by the closed box body 53. Therefore, contact of the electrolyte component with the devices such as the heat exchanger 18, the engine 10 and the like can be suppressed.

The electrolyte component is not directly discharged to the outside from the electrolyte discharge pipe 52 but is discharged into the electrolyte discharge chamber D and discharged to the outside of the vehicle body from the electrolyte discharge port 51A in the state in which the electrolyte component collides with the vertical plate 53A1 of the outer plate body 53A and is diffused. Therefore, vigorous discharge of the electrolyte component can be suppressed and at the same time, the electrolyte component can be diluted. As a result, the influence to the periphery of the hydraulic excavator 1 can be reduced.

It should be noted that in the above-described first embodiment, the example in which the electric power storage device 19 is placed on the undercover 6G through the vibration isolating member 23 is described. However, the present invention is not limited to that, and it may be so configured that a support member for the electric power storage device 19 which is different from the undercover 6G is provided on the lower surface side of the revolving frame 6, for example, and the electric power storage device 19 is provided on these members. This also applies to the second and third embodiments.

In the above-described first embodiment, the example in which the battery module 29 and the battery cell 29A of the electric power storage device 19 are electrically connected in a serial state is described. However, the present invention is not limited to that, and the battery module 29 and/or the battery cell 29A may be electrically connected in a parallel state, for example. This also applies to the second and third embodiments.

In the above-described first embodiment, the example in which the electrolyte discharge pipe 30 is mounted on the rear plate 21C of the lower box body 21 is described. However, the present invention is not limited to that, and the electrolyte discharge pipe 30 may be mounted on the front plate 21B or the left and right side plates 21D and 21E of the lower box body 21 and the like, for example. That is, the electrolyte discharge pipe 30 may be mounted anywhere in the casing 20 as long as it can communicate with the inside of the battery chamber A in which the battery module 29 of the electric power storage device 19 is disposed. This also applies to the second and third embodiments.

In the above-described first embodiment, the example in which the cooling fan 17 is rotated by the engine 10 is described. However, the present invention is not limited to that, and the cooling fan 17 may be rotated by an electric motor, a hydraulic motor or the like separate from the engine 10. This also applies to the second and third embodiments.

In the above-described first embodiment, the example in which the distal end opening 30C of the electrolyte discharge pipe 30 is penetrated in the undercover 6G located below the electric power storage device 19 is described. However, the present invention is not limited to that, and it may be so configured that the electrolyte discharge pipe 30 is extended to the hydraulic pump 11 side and its distal end opening is penetrated in the undercover 6G or the bottom plate 6A located below the hydraulic pump 11.

In the above-described second embodiment, the example in which the distal end opening 42D of the electrolyte discharge pipe 42 is arranged at the cooling air discharge port 41 formed between the left vertical plate 6B and the right vertical plate 6C is described. However, the present invention is not limited to that, and the distal end opening 42D of the electrolyte discharge pipe 42 may be arranged at the cooling air discharge port 41 at a location on the right side frame 6E side, for example.

In the above-described second embodiment, the example in which the second pipe part 42B of the electrolyte discharge pipe 42 is formed across and above the left vertical plate 6B is described. However, the present invention is not limited to that, and the second pipe part 42B of the electrolyte discharge pipe 42 may be penetrated in the left vertical plate 6B, for example. This also applies to the second embodiment.

In the above-described third embodiment, the example in which the closed box body 53 is provided between the left vertical plate 6B and the right vertical plate 6C is described. However, the present invention is not limited to that, and the closed box body may be provided below the electric power storage device 19 or on the undercover 6G on the right side frame 6E side, for example.

In the above-described embodiments, the cab-type hydraulic excavator 1 is described as an example of a construction machine. However, the present invention is not limited to that, and the present invention may be applied to a canopy-type hydraulic excavator, for example.

Moreover, in the above-described embodiments, the hybrid-type hydraulic excavator 1 provided with a crawler-type lower traveling structure 2 is described as an example of a construction machine. However, the present invention is not limited to that and can be widely applied to various hybrid-type construction machines such as an automotive wheel-type hydraulic excavator, a hydraulic crane and the like, for example.

DESCRIPTION OF REFERENCE NUMERALS

1: Hydraulic excavator (Construction machine)
2: Lower traveling structure
4: Upper revolving structure
5: Working mechanism
5D: Boom cylinder (Hydraulic actuator)
5E: Arm cylinder (Hydraulic actuator)
5F: Bucket cylinder (Hydraulic actuator)
6: Revolving frame
6A: Bottom plate (Lower surface)
6G: Undercover (Lower surface)
10: Engine
11: Hydraulic pump
12: Assist power generator/electric motor
17: Cooling fan
18: Heat exchanger 19: Electric power storage device
20: Casing
29: Battery module (Lithium ion battery)
30, 42, 52: Electrolyte discharge pipe
30C, 42D, 52C1: Distal end opening
41: Cooling air discharge port (Discharge port)
51A: Electrolytic discharge port (Discharge port)
53: Closed box body
D: Electrolyte discharge chamber
F: Cooling air

The invention claimed is:

1. A construction machine comprising:
an automotive lower traveling structure, an upper revolving structure provided rotatably on said lower traveling structure, and a working mechanism provided on a front side of said upper revolving structure and driven by a hydraulic actuator,
said upper revolving structure including:
a revolving frame forming a support structural body;
an engine provided on said revolving frame at a location on a rear part side of said revolving frame;
a hydraulic pump driven by said engine and supplying a pressurized oil to said hydraulic actuator;
an assist power generator/electric motor coupled to said engine and said hydraulic pump and performing a power generator action and an electric motor action;
a cooling fan for sucking an outside air as cooling air and supplying said cooling air toward said engine;
a heat exchanger provided on said revolving frame at a location closer to an upstream side in a flow direction of said cooling air than said cooling fan and cooling a fluid by said cooling air; and
an electric power storage device disposed on said revolving frame at a location closer to the upstream side in the flow direction of said cooling air than said heat exchanger and charging generated power by said assist power generator/electric motor or discharging the charged power, wherein
said electric power storage device has a box-shaped casing forming an outer wall and a battery module provided inside said casing and accommodating an electrolyte,
an electrolyte discharge pipe provided on said casing and configured to discharge at least one of an electrolyte mist and an electrolyte ejected from said battery module to an outside of said upper revolving structure when said battery module is in an abnormal state, and
said electrolyte discharge pipe is further configured such that a base end is connected to said casing of said electric power storage device, and a distal end is open on a lower surface side of said revolving frame.

2. The construction machine according to claim 1, wherein
said battery module of said electric power storage device is constituted as a lithium ion battery.

* * * * *